United States Patent [19]

Morris

[11] 4,077,501
[45] Mar. 7, 1978

[54] DISC FOR DISC BRAKE UNIT

[75] Inventor: Robert B. Morris, North Huntingdon, Pa.

[73] Assignee: Westinghouse Air Brake Company, Wilmerding, Pa.

[21] Appl. No.: 760,963

[22] Filed: Jan. 21, 1977

[51] Int. Cl.² .............................................. F16D 65/12
[52] U.S. Cl. ........................... 188/218 XL; 192/107 R
[58] Field of Search ................. 188/73.2, 71.6, 264 A, 188/264 AA, 218 XL; 192/107 R, 113 A, 70.12, 70.16

[56] References Cited

U.S. PATENT DOCUMENTS

| | | | |
|---|---|---|---|
| 2,350,970 | 6/1944 | Tack | 188/264 A X |
| 2,765,881 | 10/1956 | Pierce | 188/218 XL |
| 3,237,731 | 3/1966 | Du Bois | 188/218 XL |
| 3,295,641 | 1/1967 | Eaton et al. | 188/218 XL |
| 3,753,476 | 8/1973 | Dernovashek et al. | 188/218 XL X |

FOREIGN PATENT DOCUMENTS

| | | | |
|---|---|---|---|
| 1,294,910 | 4/1962 | France | 188/18 A |
| 363,824 | 3/1973 | U.S.S.R. | 188/71.6 |

*Primary Examiner*—George E. A. Halvosa
*Attorney, Agent, or Firm*—W. F. Poore; R. W. McIntire, Jr.

[57] ABSTRACT

This invention relates to an annular braking disc in which a pair of spaced-apart braking members are connected by a first set of radial fins, each adjacent spaced-apart pair of which is integral with the opposite sides of one of a second set of radial fins, the radial length of which is less than the radial length of the first set of fins. The inner ends of a certain chosen number of fins of both sets of fins are integral one with the other and so arranged and disposed as to provide one of several arcuate segments on each of which is formed an inwardly-extending circumferentially spaced-apart securing lug. The lug that is thus formed integral with each with one of these segments is so disposed inward from each of a pair of braking faces formed on the respective opposite sides of the braking disc as to be out of contact with braking elements that may have braking engagement with these braking faces. Each lug is provided with an elongated slot for receiving a bolt whereby bolts extending through the elongated slots in these lugs secure the braking disc to an annular member pressed on a car axle. The several segments of the annular braking disc have provided between each pair of adjacent segments and each pair of adjacent lugs a radial outwardly extending slot, the length of which is less than the radial length of the braking faces and substantially equal to the length of the shorter fins whereby these slots, in cooperation with the elongated slots in the lugs, provide for both radial and arcuate thermal expansion and contraction of that portion of the annular braking disc extending between each pair of adjacent slots independently of the remaining portion of this braking disc thereby eliminating cracking of the disc by thermal expansion and contraction.

5 Claims, 5 Drawing Figures

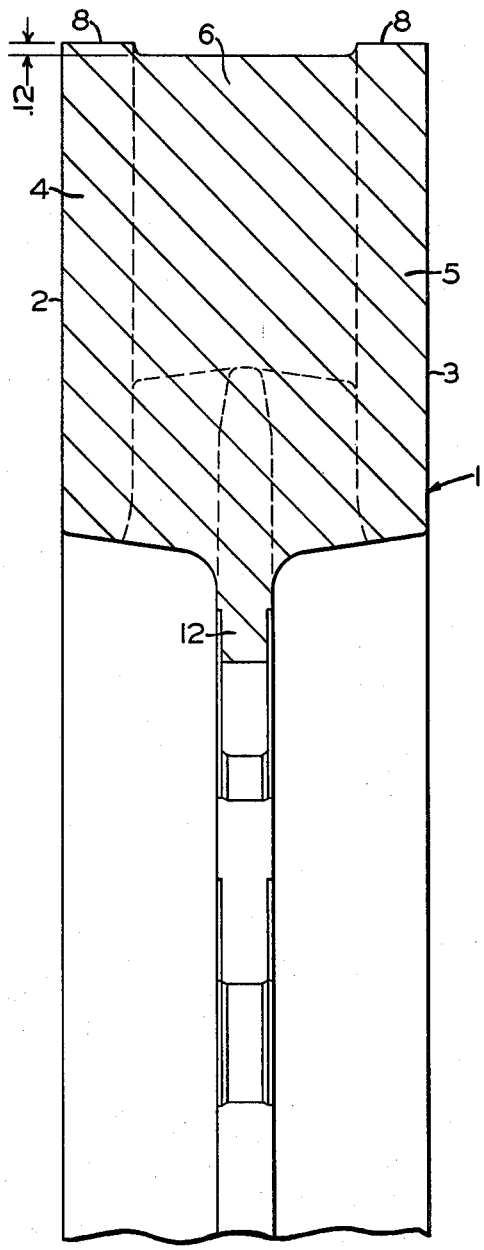
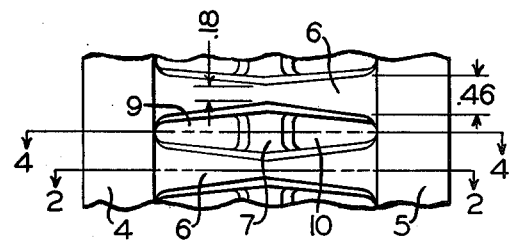
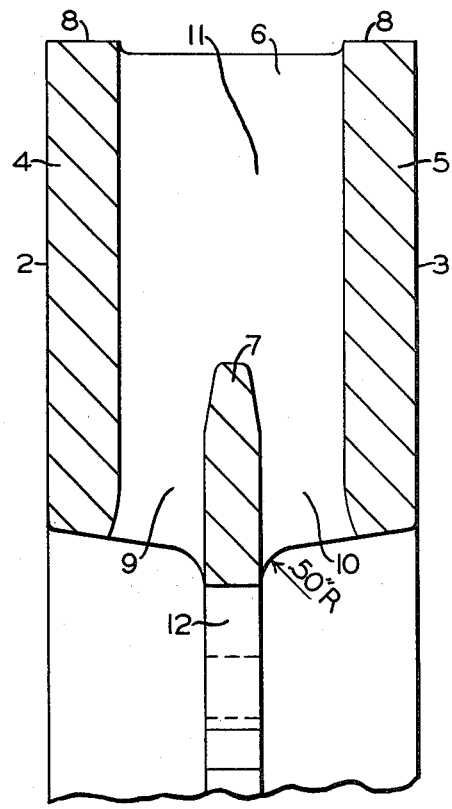
Fig.2
Fig.3
Fig.4

DISC FOR DISC BRAKE UNIT

BACKGROUND OF THE INVENTION

In U.S. Pat. No. 2,405,219, issued to Homer T. Lambert on Aug. 6, 1946, and assigned to Lambert Brake Corporation, of St. Joseph, Michigan, there is shown and described a brake disc that, after the completion of the usual machining operations required thereon, is split on radial lines into three sections after which sufficient material is removed at the severed ends of the sections to allow ample clearance between each pair of adjacent ends for expansion resulting from the generation of heat due to brake applications. This clearance between the adjacent ends of the several sections of the brake disc prevents the setting up of localized strains in the disc, which would cause warping or cracking of the disc.

When a disc is thus cut into sections, some means, such as tie-bolts and nuts, are required to secure the several sections together to form an annular braking disc, it being apparent that these securing means further increase the cost of the braking disc.

Accordingly, it is the general purpose of this invention to provide a one-piece metallic annular braking disc having novel means for preventing warping and cracking of the disc by the expansion of the metal resulting from the generation of heat produced by pressing braking elements against the respective opposite sides of the disc while a brake application is in effect.

SUMMARY OF THE INVENTION

According to the present invention, a novel one-piece braking disc comprises a pair of spaced-apart coaxial annular braking members, the adjacent sides of which are formed integral with the respective opposite ends of a first set of radially extending circumferentially spaced-apart fins. Midway between the two spaced-apart coaxial annular braking members, each fin of each adjacent spaced-apart pair of fins of this first set of fins is formed integral with one side of one fin of a second set of radially extending fins, the radial length of these fins of this second set of fins being less than that of the first set of fins. The inner ends of a certain chosen number of the fins of both sets of fins are integral one with the other and so arranged and disposed as to provide several arcuate segments on each of which is formed an inwardly-extending circumferentially spaced-apart securing lug. The lug that is thus formed integral with each one of these segments is so disposed inward from each of a pair of braking faces formed respectively on the outside of the annular braking members as to enable wear of these braking faces without damage to these lugs by braking elements engaging these braking faces.

The end of each of these segments is spaced apart from the adjacent end of the next adjacent segment so as to provide an outwardly extending slot, the length of which is less than the radial length of the braking faces and substantially equal to the length of the shorter fins. Each lug is also provided with an elongated slot. These several elongated slots in the lugs cooperate with the outwardly extending slots between each pair of adjacent segments so that when the braking disc is secured by bolts extending through these elongated slots in these lugs to an annular member pressed on a car axle, these slots in the lugs and between each pair of adjacent segments provide for both radial and arcuate thermal expansion and contraction of the braking disc without cracking, warping or other damage to the disc.

In the accompanying drawings:

FIG. 2 is a cross-sectional view, taken along the line 2—2 in FIG. 1 and showing certain details of construction not made apparent in FIG. 1.

FIG. 3 is a view looking in the direction of the arrow A shown in FIG. 1.

FIG. 4 is a cross-sectional view, taken along the line 4—4 of FIG. 3 and showing certain details of construction not made apparent in FIG. 2.

DESCRIPTION

Figure 1:
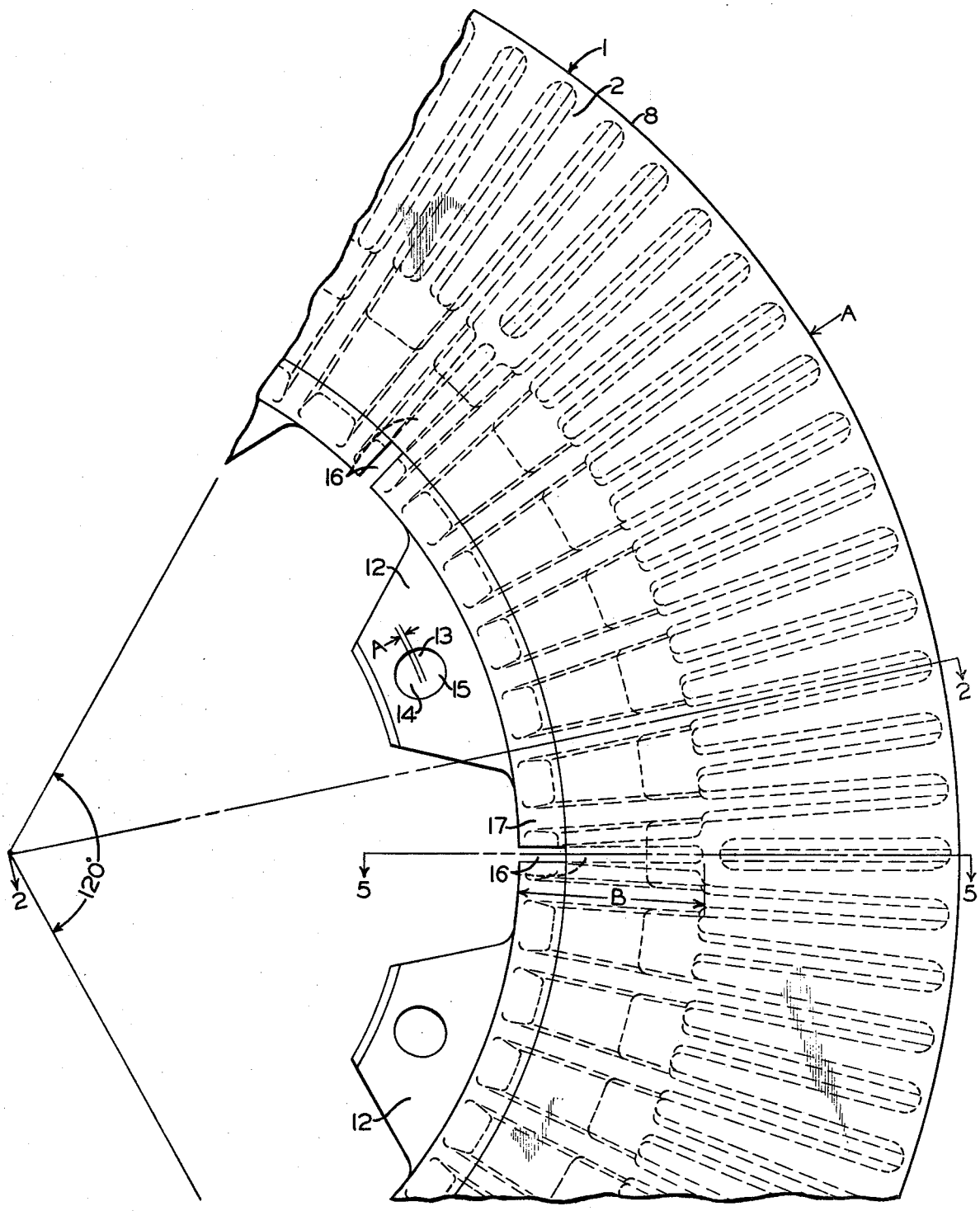
FIG. 1 is an elevational view of a portion of an annular braking disc, the construction of the remainder of the disc being the same as that of the portion shown.

As shown in the drawings, an annular braking disc is denoted by the reference numeral 1. This annular braking disc 1 is cast as a single member after which flat braking faces 2 and 3 are formed on the respective opposite sides thereof, as by a machining operation.

Figure 5:
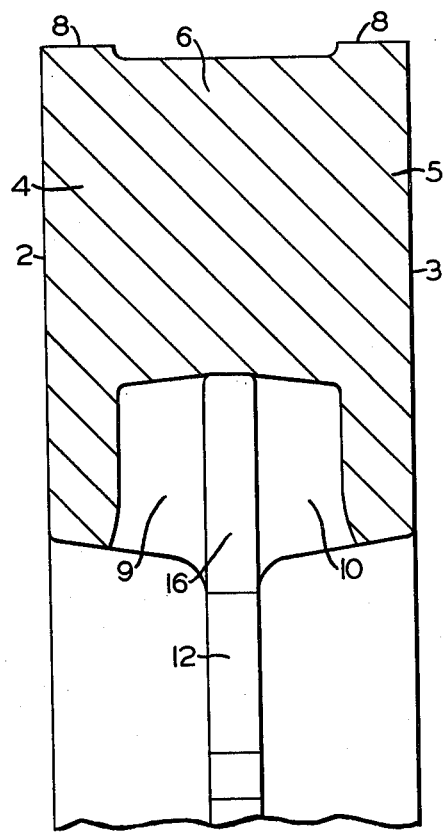
FIG. 5 is a cross-sectional view, taken along the line 5—5 in FIG. 1 and showing certain details of construction not made apparent in FIGS. 1, 2, 3 and 4.

As shown in FIGS. 2, 4 and 5, the braking face 2 is formed on the left-hand side or outside of an annular braking member 4 and the braking face 3 is formed on the right-hand side or outside of an annular braking member 5. These annular braking members 4 and 5 are disposed in coaxial spaced-apart relationship and are connected by a plurality of radially extending equally spaced-apart fins 6 that are cast integral with these braking members 4 and 5.

As shown in FIG. 3 of the drawings, each fin 6 is tapered inward from each end thereof toward a point midway the ends thereof. This taper may be such that the width of each fin 6 at the point midway its ends is, for example, 0.18 inch, and the width at the respective opposite ends that are integral with the braking members 4 and 5 is, for example, 0.46 inch.

As further shown in FIGS. 3 and 4, each adjacent pair of fins 6 midway their length is connected by a fin 7, it being apparent from FIG. 3 that each of these fins 7 is cast integral with the adjacent pair of fins 6. Each fin 6 extends radially such a distance that the outer end of each of the these fins terminates at a point that is slightly below, for example, 0.12 inch, the peripheral surface 8 of the braking members 4 and 5, as shown in FIG. 2.

As best shown in FIG. 4, the fins 7 extend radially somewhat less than one-half that of the fins 6. Consequently, as shown in FIGS. 3 and 4, each fin 7 cooperates with the adjacent pair of fins 6 and the braking members 4 and 5 to form two cooling air passageways 9 and 10 that at the outer end of the fin 7 merge to form a single cooling air passageway 11 that extends between each two adjacent fins 6 to the outer end of these fins.

From the foregoing, it is seen that the annular braking disc 1 is provided with a plurality of arcuately spaced-apart radial passageways through which atmospheric air may circulate as this brake disc 1 rotates with a railway vehicle truck axle on which it may be mounted by any suitable means (not shown). Accordingly, it is apparent that atmospheric air flowing through the plurality of air passageways 9, 10 and 11 in the braking disc 1 will act to cool this rotating disc 1 and remove heat from the braking members 4 and 5 while braking elements (not shown) are pressed against the braking faces 2 and 3 to effect a brake application on the vehicle.

As shown in FIG. 1, formed or cast integral with the inner ends of the fins 6 and 7 are a plurality of inwardly-extending circumferentially spaced-apart securing lugs 12. As shown in FIGS. 2, 4 and 5, these lugs 12 are disposed a substantial distance inward from the braking faces 2 and 3.

In order to enable the braking disc 1 to be secured to an annular member (not shown) which may be pressed on a railway vehicle truck axle (not shown), each of the lugs 12 is provided with an elongated slot 13. Each of these slots 13 comprises a pair of semicircles 14 and 15 each having the same radius. The centers of these radii lie on a radial line passing through the center of the annular braking disc 1 and are spaced apart one from the other along this radial line a chosen distance which is denoted in FIG. 1 by the distance A and may be, for example 0.03 inch.

As is apparent from FIG. 1, the inner ends of a chosen number of fins of both sets of fins are integral one with the other and so arranged as to provide one of several arcuate segments on each of which is formed integral therewith an inwardly-extending lug 12. These several segments provide between the adjacent ends of each adjacent pair of segments a slot 16. Thus, each segment constitutes an annular web 17 extending between the two slots 16 shown in FIG. 1, it being apparent from FIG. 1 that one of the lugs 12 is integral with each web 17.

Furthermore, each of the slots 16 extend radially outward a chosen distance indicated as B in FIG. 1, this distance B being the same as the radial length of the shorter fins 7.

Moreover, each of these slots 16 is located midway between the braking members 4 and 5 as shown in FIG. 5, which is a section through the center of one of these slots, as indicated in FIG. 1.

The braking disc 1 is provided with eight securing lugs 12, in each of which lugs 12 is an elongated slot 13, and eight radial outwardly extending slots 16. This braking disc 1 may be secured to the annular member pressed onto an axle of a railway vehicle truck by eight bolts and nuts (not shown) each of which bolts extends through an elongated slot 13 in one of the eight lugs 12.

With the annular braking disc 1 thus secured to the annular member on an axle of a truck and if, while the truck is traveling along a railway track at a high speed, braking elements are pressed against the braking faces 2 and 3, heat will be generated which will cause the temperature of the metal comprising this disc 1 to increase to as much as 500 degrees Fahrenheit.

It has been found by actual test of a braking disc constructed as shown in FIGS. 1 to 5 that the elongated slots 13 in the eight securing lugs 12 and the eight slots or cavities 16 in this braking disc so cooperate as to allow both radial and arcuate thermal expansion of the metal comprising the braking disc without causing cracking, warping or any other damage to this disc.

Having now described the invention, what I claim as new and desire to secure by Letters Patent, is:

1. For use in a disc brake unit, an annular braking disc comprising:
   (a) a pair of spaced-apart braking members each having extending from one side thereof a flat annular braking surface for braking engagement by a braking means,
   (b) a first plurality of arcuately spaced-apart radially-extending fins disposed between said pair of spaced-apart braking members, each spaced-apart fin having substantially the same radial length as the radial length of said pair of braking members and its respective opposite ends formed integral with said spaced-apart braking members,
   (c) a second plurality of arcuately spaced-apart radially extending fins, the inner ends of which terminate at the inner ends of said first plurality of fins, each fin having a radial length that is less than the radial length of said first plurality of arcuately spaced-apart fins and each so disposed midway between said pair of spaced-apart braking members that its respective opposite sides are integral with the adjacent sides of the adjacent pair of said first plurality of fins whereby each fin of said second plurality of fins is disposed midway the length of the adjacent pair of fins integral therewith, a certain chosen number of the plurality of alternately spaced short and long fins providing one of several arcuate segments, the length of each segment being such that each end of each arcuate segment is spaced apart from the adjacent end of the adjacent arcuate segment whereby there is thus formed between the adjacent ends of each adjacent pair of segments a radial outwardly extending slot, the length of which is substantially equal to the length of the shorter fins, and,
   (d) a plurality of inwardly extending securing lugs, each lug being integral with one of said several arcuate segments and, wherein the improvement comprises, an aperture in each lug, the inner periphery of which constitutes two spaced-apart semicircles having the same radius, the centers of said radii being spaced apart one from the other a chosen distance on a radial line passing through the center of said annular braking disc,
   (e) said annular braking disc having formed therein said plurality of arcuately spaced-apart radially outwardly extending slots that so cooperate with said apertures in said lugs as to enable both radial and arcuate thermal expansion and contraction of that portion of said annular braking disc extending between each pair of adjacent radially outwardly extending slots independently of the remaining portion of said annular braking disc thereby preventing thermal cracking of said disc.

2. An annular braking disc, as recited in claim 1, further characterized in that said chosen distance between the centers of said radii is 0.03 inch.

3. An annular braking disc, as recited in claim 1, further characterized by an annular web disposed between and integral with each one of said several arcuate segments and the corresponding securing lug, the outer diameter of each of said annular webs being substantially the same as the inner diameter of said pair of braking members.

4. An annular braking disc, as recited in claim 3, further characterized in that each of said radial outwardly extending slots is so disposed between a pair of adjacent annular webs that the respective slot extends radially outward a chosen distance from the inner periphery of said annular web.

5. An annular braking disc, as recited in claim 3, further characterized in that a radial line passing through the centers of said radii forms the same angle with a radial line passing through the center of the slot at one end of one arcuate segment and one end of the corresponding annular web as with a radial line passing through the center of the slot at the other end of said one arcuate segment and the other end of said corresponding annular web.

* * * * *